Nov. 18, 1947.  R. B. BARNES  2,431,019
MULTICOMPONENT-GAS ANALYZER
Filed Aug. 29, 1944  2 Sheets—Sheet 1
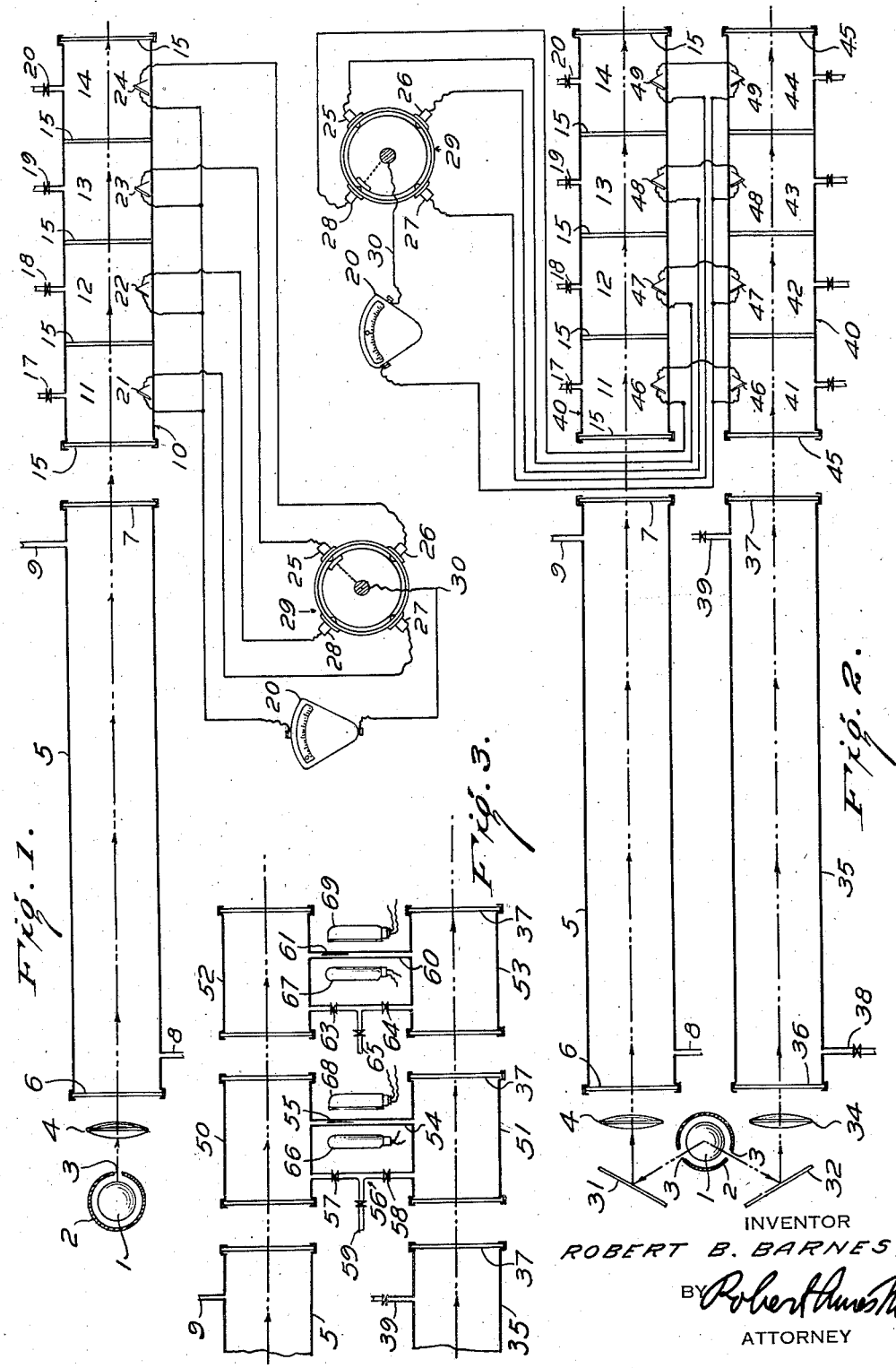
INVENTOR
ROBERT B. BARNES,
BY
ATTORNEY Nov. 18, 1947.  R. B. BARNES  2,431,019
MULTICOMPONENT-GAS ANALYZER
Filed Aug. 29, 1944   2 Sheets-Sheet 2
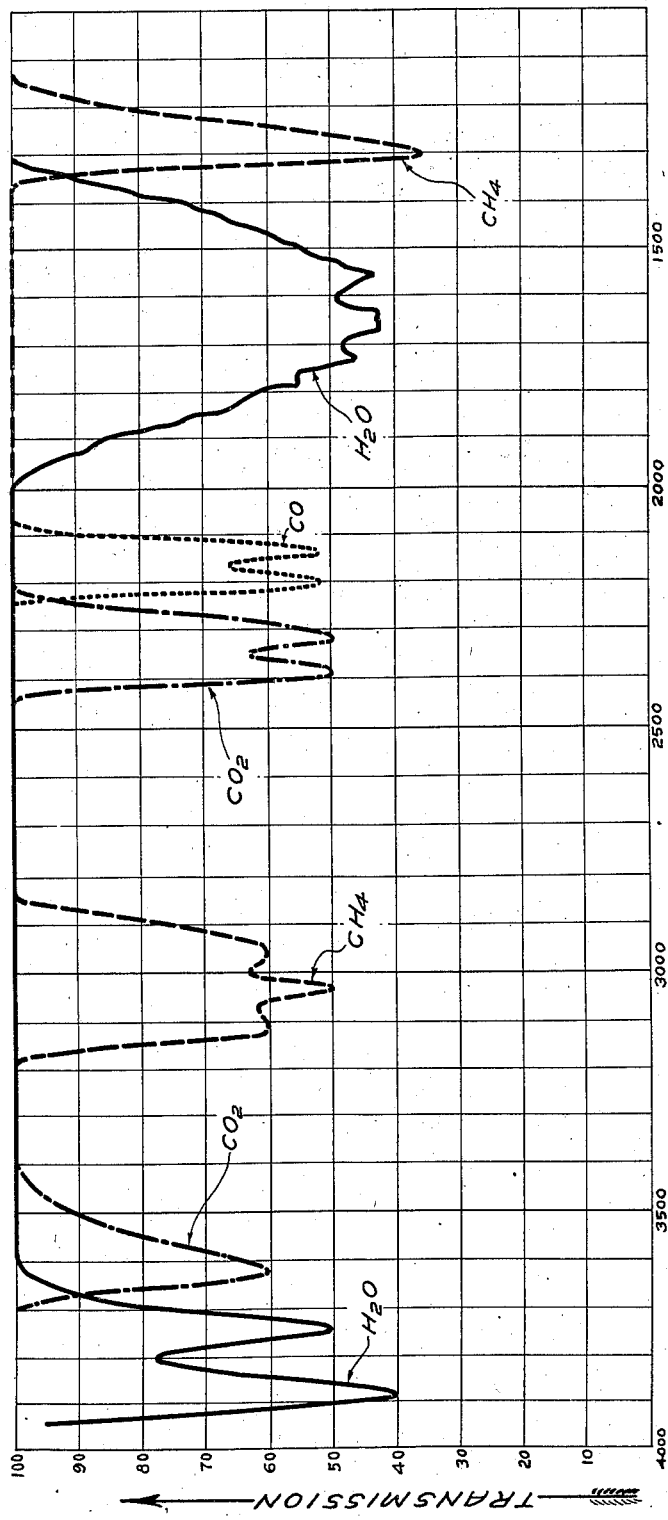
INVENTOR
ROBERT B. BARNES
ATTORNEY Patented Nov. 18, 1947

2,431,019

UNITED STATES PATENT OFFICE 2,431,019

MULTICOMPONENT-GAS ANALYZER

Robert Bowling Barnes, Stamford, Conn., assignor to American Cyanamid Company, New York, N. Y., a corporation of Maine Application August 29, 1944, Serial No. 551,735

9 Claims. (Cl. 250—43)

This invention relates to a method of simultaneous analyses of a plurality of components of a multicomponent gas by use of infrared radiation. More particularly, the invention relates to apparatus for performing the above function.

In recent years the absorption at various points in the infrared spectrum of compounds, particularly organic compounds in the vapor phase, has been used for analytical purposes. In spite of the valuable information which can be obtained by measurement of the infrared absorption of gases, this tool has been greatly restricted because of certain practical difficulties. In the first place, heated bodies which are normally used as the infrared radiators do not radiate at all uniformly through the useful infrared spectrum, namely, radiation from wave lengths of about 1 micron to 30 microns, or in the alternative units, from 10,000 to 300 reciprocal centimeters (cm.$^{-1}$). This precludes many types of direct measurements and requires comparison with the emission spectrum of the infrared radiator, a time consuming operation requiring a careful supervision, which is mainly suitable for the research laboratory. The problem is further complicated by the fact that it is extremely difficult to keep the emission of an infrared radiator absolutely constant.

Another serious practical difficulty lies in the fact that it has been considered necessary in the past to use very narrow bands of infrared radiation, because otherwise absorption in one part of the spectrum would mask the effect in other parts. Infrared monochromators are for the most part bulky and very expensive, because in the far infrared salt optics are required. Band pass filters in the infrared are difficult to construct and generally not very satisfactory. The use of narrow bands of infrared radiation have, therefore, seriously interfered with the design of practical apparatus which can be used in industry.

In the patent of Pfund, No. 2,212,211, there is proposed a method of analysis for one component of a gas by using infrared radiation. The apparatus of Pfund operates by passing a beam of substantially monochromatic infrared radiation through an absorption cell, after which the radiation is focussed on a bolometer or on a gas thermometer which determines the total quantity of heat contained in the radiation. By first calibrating the apparatus with a non-absorbing gas such as $CO_2$ free air and then admitting an absorbing gas such as carbon dioxide to the absorption chamber Pfund was able to determine quantitatively the difference in the heat content of the infrared radiations before and after their partial or complete absorption by the sample under test.

The Pfund device represented a considerable improvement in the measurement of a single gaseous component. However, no analysis of a multicomponent gas is possible and in many operations it is important to know the proportions of a number of components. This is particularly important in vapor phase catalyses, certain distillation problems, and the like, where indication or control of the relative amounts of a plurality of components of the gas is of importance. While theoretically it is possible to set up a series of Pfund machines, this would be both cumbersome and expensive and would raise a practically insurmountable problem of maintaining calibration between the different machines constant at all times.

The present invention, while utilizing a principle which is used in the Pfund device, permits analysis of a multicomponent gas giving measurements of each component. The invention is based on the discovery that it is possible to analyze simultaneously for a number of components because I have found that it is generally possible to choose a broad band of infrared radiation within which the different components will show different absorption bands and there will be no substantial overlapping. In such a case it is sufficient to utilize a single gas chamber through which the multicomponent gas to be analyzed is passed, followed by a series of detector chambers, such as are used by Pfund, each containing one component of the gas. The infrared radiation passes in series through all of the chambers and each chamber selects only that portion of the infrared radiation in which its component absorbs strongly. All other wave lengths pass through substantially unabsorbed and the heat rise in each chamber is therefore effected only by the proportion of its particular component in the gas to be measured. The relative proportions of other components do not have any effect.

Not only is it possible by means of the present invention to analyze for a number of components in a gas at the same time, but the important advantage over Pfund's device lies in the fact that no monochromator is necessary. Each detector cell selects its own wave length, and therefore in many cases unfiltered infrared radiation may be used. This eliminates the tremendous difficulties involved in obtaining monochromatic or narrow band radiation which Pfund recommends, and at the same time assures that there is no loss in energy in the particular narrow band where each detector cell absorbs. This last is of greatest practical advantage. Many absorption bands in the infrared are quite narrow, and often the proportion of the total radiation from the infrared radiator in the particular absorption band is very small. Heat measurements, either by the modified gas thermometer method used by Pfund, differential manometers or by electrical methods using thermocouples, thermopiles, bolometers, and the like, are subject to inaccuracies. The greater the amount of energy in the particular band absorbed by each detector chamber, the smaller is the relative instrumental error and the greater the accuracy. It is unusual that a device capable of performing multiple functions will operate with improved accuracy and reliability over a single function device. Usually the performance of a number of functions involves some compromise. In the present case, however, operation is more reliable and more accurate than with a single component analysis in a Pfund device.

Although it is one of the important practical advantages of the present invention that monochromatic infrared radiation is unnecessary, it is sometimes undesirable to use the whole of the infrared spectrum out to 300 reciprocal centimeters ($cm.^{-1}$). There are certain cases where different components may have overlapping absorption bands in the far infrared. This part of the spectrum is also less desirable in some cases because the amount of energy begins to fall off. Where difficulty would be encountered due to absorption bands overlapping in the far infrared it is desirable to use cutoff filters. For example, calcium fluoride in the form of the mineral fluorite cuts off fairly sharply beyond 1250 $cm.^{-1}$. These filters present no such problem as narrow band pass filters, and of course are in no way comparable in complexity to an infrared monochromator. Where it is desired to use fluorite to cut off the far infrared the whole apparatus may be made with fluorite windows, thus permitting these windows to perform two functions. In certain cases cutoff of other regions of the infrared may be desirable and it may be necessary to use windows or filters of suitable halide crystals, or even in some cases other material, such as quartz.

In its broader aspects the present invention includes the use of a single chamber through which the multicomponent gas to be analyzed is passed. This portion of the apparatus is similar in design to that shown in the Pfund patent. Such an apparatus is capable of multicomponent analyses and presents the operating advantages over the Pfund apparatus set out above. However, like all uncompensated measurements, it is subject to external temperature effects on the detector cells, and therefore requires rather careful insulation and thermostatic control. I prefer, therefore, to use a balanced instrument in which an infrared beam, preferably from the same radiator, is split, one beam passing through the cell in which the gas to be analyzed flows, while the other passes directly into a series of detector cells without absorption from the gas to be measured. The detector cells for each component are then present in pairs and a differential of the temperature rise in the pairs of cells is employed for measurement. This may be an electrical differential where thermocouples are located in the two cells, or it may be a mechanical differential, such as a differential manometer. I prefer the use of thermocouples, as the differential currents produced can be used more readily for measurement or control devices.

The use of differential absorption avoids errors from the effect of outside temperature changes on the detector cells and, under favorable circumstances where a single radiator is used, it also reduces errors resulting from changes in the emission of the radiator with time. The differential measurement also increases the accuracy and sensitivity. In the present application I do not claim broadly the principle of differential measurement. This principle forms the subject matter of the co-pending application of Kidder and Berry, Serial No. 551,756 filed August 29, 1944. In the present case differential absorption is described and claimed only in connection with the underlying broad invention of the present case, namely, the analyses of a plurality of components in a multicomponent gas.

The present invention is not broadly concerned with what utilization is made of the temperature rise in the various detector cells or pairs of cells. The temperature rise may be employed in any suitable conventional type of measuring or controlling instrument. For example, where thermocouples are used a very practical device involves the utilization of a recording galvanometer which is successively switched in series with the different thermocouples. This type of instrument is conventional in the recording of a plurality of currents and it is an advantage that a commercial instrument of this type can be employed in an apparatus of the present invention without major change. The currents may also be used to actuate control devices through the usual relays. The present invention thus opens up the whole field of industrial measurement, record and control to multicomponent gases.

The invention will be described in greater detail in conjunction with the drawings in which:

Fig. 1 is a diagrammatic section through an apparatus using a single gas analyzing chamber;

Fig. 2 is a similar view of an apparatus for differential measurement;

Fig. 3 is a detail of a modified form of differential detector cells shown in Fig. 2; and Fig. 4 is a series of infrared absorption curves of four gases.

In the apparatus shown in Fig. 1 the infrared radiator 1 may be an electrically heated silicon carbide rod enclosed in a housing 2 with a narrow opening 3 through which a beam of infrared radiation emerges and is collimated by the lens 4 of suitable infrared transmitting material. The beam then passes through a gas analyzing chamber 5 provided with infrared transparent windows 6 and 7. Gas inlet tubes 8 and 9 permit maintenance of a flow through the chamber of the multicomponent gas to be analyzed. After passing through the gas analysis chamber the beam enters a series of four detector chambers 11, 12, 13 and 14, which may be contained in a single cylindrical housing 10. The separate chambers, which are gas tight, are formed by the transparent partitions 15. The chambers are provided with valved filling pipes 17, 18, 19 and 20, respectively. The absorption chambers 11 to 14 also contain thermocouples 21, 22, 23 and 24, respectively. These thermocouples are located outside of the beam.

One side of each thermocouple is connected to a recording galvanometer 20. The other sides are connected to contacts 25, 26, 27 and 28 of a switch 29 of conventional design for multiple recording galvanometers. The rotor of the switch is connected to the galvanometer through wire 30. This portion of the device forms no part of the present invention and is a purely diagrammatic representation of a conventional commercial multiple galvanometer.

Fig. 2, in which the same parts bear the same reference numerals, is an improved device using differential detection. In this modification the housing of the infrared radiator 1 has two openings so that two beams of infrared radiation strike mirrors 31 and 32. One beam after collimation by lens 4 passes through the gas analyzing chamber 5 and the series of detector chambers 11 to 14, as described in Fig. 1. The other beam is collimated by the lens 34, passes through the second chamber 35 of similar design to chamber 5 and provided with transparent inlet and exit windows 36 and 37. This chamber is provided with valved filling pipes 38 and 39. A second series of four detector chambers 41, 42, 43 and 44, preferably of design identical to that of the chambers 11 to 14, are formed in a cylindrical housing 40 with transparent partition walls 45. These chambers are provided with thermocouples 46, 47, 48 and 49 in the same manner as the chambers 11 to 14. Each pair of thermocouples, which may advantageously be of identical size and design, is connected in opposition so that a differential of the current produced by the thermocouples of each pair flows in the thermocouple circuits. These circuits are connected to the recording galvanometer 20 and switch 29 in the same manner as is described in Fig. 1, but the galvanometer registers the differential current of each pair of thermocouples instead of the whole current of a single thermocouple.

The operation of the device shown in Fig. 1 is as follows: The description will be in connection with the analysis of gases leaving a converter in which methane and steam are catalytically converted into hydrogen and oxides of carbon. The reaction, as in most vapor phase catalyses, is not quantitative and the gases will therefore contain in addition to hydrogen varying amounts of water vapor, carbon dioxide, carbon monoxide and unreacted methane. It is important to be able to determine at all times the relative amounts of these various gases. For this purpose a portion of the gases leaving the converter is caused to flow through the gas analysis chamber 5 of Fig. 1, entering through pipe 8 and leaving through pipe 9. The detector cells 11 to 14 are each filled with a pure component, for example in order, water vapor, carbon dioxide, carbon monoxide and methane. The temperature rise in each detector chamber depends on the intensity of the infrared beam and on the degree of absorption of infrared energy in the chamber 5 at the wave length where each component absorbs strongly. The greater the concentration of the given component in the chamber 5 the greater the absorption, and hence the smaller the energy of that particular wave length which strikes the same gas in the detector cells. Each thermocouple will, therefore, be capable of providing a current which depends on the concentration of the particular component which is present in the chamber 5. The current from each thermocouple is impressed in turn on the galvanometer 20 by the slowly rotating switch 29 which successively connects each thermocouple. The galvanometer may be calibrated before the start of measurement by passing a gas, such as nitrogen, through the chamber 5. Pure nitrogen does not show absorption bands in the portion of the infrared spectrum utilized and the galvanometer reading for each thermocouple therefore corresponds to zero percent of the component in the chamber 5.

Each detector chamber measures the concentration of its particular component in the chamber 5 and is unaffected by the absorption in the other chambers, provided that there are no appreciably overlapping absorption bands. In the case specifically used as an illustration there are no such overlapping absorption bands until the far infrared is reached. Therefore, the windows 6, 7 and 15, and also the lens 4 may advantageously be made of fluorite which cuts out radiation in the far infrared where absorption band overlaps are a serious factor.

It will be noted that there is no need for any monochromator or band pass filter, and on the contrary a wide portion of the infrared spectrum is employed which permits using more than one absorption band in most cases. Maximum energy is therefore available and more reliable indications are obtained. Nevertheless, great care must be taken to keep ambient temperature changes from the detector cells.

Fig. 2 illustrates a device in which ambient temperature changes are equalized. Here the comparison cell 35 may be filled with nitrogen or evacuated so as to provide a path without significant absorption in the portion of the infrared spectrum used. Each pair of detector chambers 11 and 41, 12 and 42, 13 and 43, and 14 and 44 are filled with the same component, the amount of which is to be measured. The instrument is then adjusted by passing pure nitrogen or similar non-absorbing gas, through the analysis chamber 5 and setting the galvanometer 20 so that it reads zero for each pair of thermocouples. The gas to be analyzed is then passed through the analysis chamber 5, as described in connection with Fig. 1. Presence of varying amounts of water vapor, carbon dioxide, carbon monoxide and methane in the gas analysis chamber will reduce the temperature rise correspondingly in the detector chambers 11 to 14. They will not, however, affect the temperature rise in detector chambers 41 to 44, and a differential current will result because one thermocouple of each pair will be receiving less heat than the other. These differential currents are successively indicated or recorded by the galvanometer 20.

The modification in Fig. 2 not only avoids errors due to ambient temperature changes around the detector cells, provided all of the cells are surrounded by a medium of the same temperature at any one time, but further advantages result because the accuracy is increased. In the case of Fig. 1 the galvanometer 20 has to have a sensitivity such that it will operate satisfactorily over the whole range from zero absorption in the chamber 5 to maximum absorption for any one component. This requires a galvanometer which covers a considerable range, and it cannot therefore safely be made unduly sensitive. In Fig. 2, however, only the differential between the thermocouple output in each pair is measured. The galvanometer therefore has to operate over only a relatively small range either side of the zero center reading and the sensitivity of the galvanometer can therefore be increased. At the same time the readings are less affected by instrument errors because a differential is being directly recorded instead of comparing the two independent readings. There is also much less change with variations in radiation from the radiator 1 and the modification using balanced detector cells is by far preferable. The advantages of the balanced cell are obtained without any sacrifice in the features of multicomponent analysis.

In most operations it is desirable to fill the cell 35 with a gas which does not absorb in the infrared. In some cases it may be desirable to use as a standard a gas mixture which does have a definitely predetermined absorption. This device may also be employed to calibrate the instrument while it is operating. When the reading of any particular pair of detector chambers corresponds to a certain concentration of one of the components, the same concentration may be introduced momentarily into chamber 35. The galvanometer should then read zero. The possibility of checking the calibration while the machine is operating is an additional advantage of this modification of the invention.

Fig. 3 shows a modification which uses the differential manometer type of measurement rather than pairs of thermocouples. As the construction of the radiator and the two chambers is the same as in Fig. 2 they are not shown in detail. The figure illustrates only the two exit windows 7 and 37. Two pairs of detector cells are shown, the first pair being numbered 50 and 51, and the second pair 52 and 53. The first pair are connected by two tubes. One of these, 54, is always open and carries a small drop of oil 55. The other tube, 56, is in the form of a T with valves 57 and 58 and a central valved tube 59. The cells 52 and 53 are similarly connected with a capillary tube 60 containing a drop of oil 61, T tube provided with valves 63 and 64 and valved center connection 65.

The two pairs of detector chambers are filled through the valved tubes 59 and 65 with pure gases, the presence of which is to be measured. When the chambers are filled the pressure is, of course, equalized and all valves are closed. The oil droplets are then in a central or other predetermined position. Operation proceeds as is described in Fig. 2, but instead of changes in concentration in the chamber 5 producing differential currents from a pair of opposed thermocouples, differences will result in pressure differentials in the detector chambers and the oil drops will move through the capillaries. These drops may be observed or, as is shown in the figure, two droplets may act as light valves between lights 66 and 67 and cooperating photocells 68 and 69. The wires from the photocells may be led to a conventional multiple recording galvanometer, such as is shown in Figs. 1 and 2.

The device of Fig. 3 is sensitive for very small concentrations of gases to be measured, but is inferior to the thermocouple pairs shown in Fig. 2 when a wide range of operation or ruggedness is desired. The power output of the photocells is of course enormously greater than that of the thermocouples, as the strong light and oil droplet constitute a photoelectric relay. A much cheaper and more rugged type of recording galvanometer may therefore be used.

Fig. 4 shows the infrared absorption of the four components referred to in the description of the operation of Figs. 1 and 2. The curves are shown for the desired portion of the infrared spectrum, namely between 4,000 and 1,000 reciprocal centimeters $(cm.^{-1})$. It will be noted that in the comparatively small detector cells the transmission of all of the components is substantially 100%, except at points where sharp absorption bands are present. Only the component represented by a solid line is shown throughout its full curve. The curves of the other components between absorption bands are practically coincident therewith. It will be apparent that there is no interference of one component with the other and absorption bands do not overlap to any significant extent. The accuracy of the analysis for each component is therefore substantially unaffected by the presence of the other components, and this is one of the striking advantages of the device of the present invention.

The number of components which can be measured in devices of the present invention is limited only by overlapping absorption bands. For most practical purposes the number of components in any given gas are limited and devices having from two to about five detector chambers will normally serve the majority of practical purposes. The devices of the present invention are quite flexible, since the detector chambers can be filled with any gas desired. Thus the instrument may be used first for measurement of one multicomponent gas and then another. In other words, it may be used as a standard research tool. On the other hand, the device is so low in cost and can be made so rugged that it can be used for permanent measurement or control of the composition of gases from any industrial process. In such cases it is generally preferable to design the machine for the particular operation instead of using a compromise design. Optimum results are thus obtainable because the size of the detector chambers, gas analysis chambers, and the sensitivity of thermocouples and galvanometers can be chosen for a relatively narrow range of variation.

In the drawing the detector cells are shown as being of the same size. The drawings also show only a single thermocouple in each detector chamber. In practice, a plurality of thermocouples are used in each chamber to give more uniform response and increased sensitivity. It is an advantage of the present invention that the design of apparatus is so simple and flexible that instruments may be built to give optimum results for wide range of gas analysis problems.

In describing the operation of the device, it has been assumed that each detector cell is filled with a pure component. The partial pressure in the detector cells and their shape may be so chosen as to give the most desirable sensitivity for any particular analysis. Certain components have a low vapor pressure or are corrosive or otherwise unsuitable as fillings for the detector cells. In such case, it is sometimes possible to substitute another gas which has an absorption band in the same part of the spectrum as the desired component. Thus, for example, where the vapor pressure of water may adversely affect the sensitivity of the machine, another material such as ammonia may be used which has an absorption band that overlaps one of the absorption bands of water vapor. The possibility of such substitution extends the field of the present invention to the measurement of some gaseous components for which it would be otherwise unsuitable.

I claim:

1. A device for analyses of multicomponent gases, which comprises, in optical alignment, a source of infrared radiation, means for producing a beam therefrom, a gas analyzing chamber provided with inlet and exit windows transparent through a wide band of the infrared spectrum, means permitting a flow of gas to be analyzed through said chamber, a plurality of detector cells positioned to be traversed in series by said beam, means for filling the detector cells with different gases, and measuring means responsive to temperature changes in said detector cells due to infrared absorption by the gases therein, said gases having substantially no overlapping absorption bands in the wave lengths of the infrared beam traversing the chamber and striking the detector cells.

2. A device for analyses of multicomponent gases, which comprises, in optical alignment, means for producing two beams of infrared radiation substantially equal in wave length distribution and intensity, a gas analysis chamber located in one of said beams having inlet and exit windows transparent throughout a wide band of infrared radiation, means permitting a flow of gas to be analyzed through said chamber, a plurality of pairs of gas detector cells, one set of each pair being traversed in series by one of the beams and the other by the other, means for filling said pairs of cells with different gases and measuring means responsive to the difference in temperature rise in the gases in the two units of each pair of detector cells due to infrared absorption by the gases therein, said gases having substantially no overlapping absorption bands in the wave lengths of the infrared beam traversing the chamber and striking the detector cells.

3. A device for analyses of multicomponent gases, which comprises, in optical alignment, a source of infrared radiation, means for producing a beam therefrom, a gas analyzing chamber provided with inlet and exit windows having a sharp cutoff in the far infrared, means permitting a flow of gas to be analyzed through said chamber, a plurality of detector cells positioned to be traversed in series by said beam, means for filling the detector cells with different gases, measuring means responsive to temperature changes in said detector cells due to infrared absorption by the gases therein, said gases having substantially no overlapping absorption bands in the wave lengths of the infrared beam traversing the chamber and striking the detector cells.

4. A device for analyses of multicomponent gases, which comprises, in optical alignment, means for producing two beams of infrared radiation substantially equal in wave length distribution and intensity, a gas analysis chamber located in one of said beams provided with inlet and exit windows having a sharp cutoff in the far infrared, means permitting a flow of gas to be analyzed through said chamber, a plurality of pairs of gas detector cells, one set of each pair being traversed in series by one of the beams and the other by the other, means for filling said pairs of cells with different gases and measuring means responsive to the difference in temperature rise in the gases in the two units of each pair of detectors cells due to infrared absorption by the gases therein, said gases having substantially no overlapping absorption bands in the wave lengths of the infrared beam traversing the chamber and striking the detector cells.

5. An apparatus according to claim 1 in which the measuring means includes at least one thermoelectric element and means responsive to electric currents generated by said thermoelectric element.

6. An apparatus according to claim 2 in which thermoelectric elements are located in each pair of gas detector chambers and are connected in opposition so that a current is produced which is a measure of the temperature differential of the gases in the two detector chambers of each pair.

7. An apparatus according to claim 2 in which each pair of gas detector chambers are connected by a capillary tube containing a drop of liquid and light source, and photoelectric device located so as to give a varying electric output with movement of the liquid drop.

8. An apparatus according to claim 3 in which the windows are composed of fluorite.

9. An apparatus according to claim 4 in which the windows are composed of fluorite.

ROBERT BOWLING BARNES.

REFERENCES CITED

The following references are of record in the file of this patent:

UNITED STATES PATENTS

| Number | Name | Date |
|---|---|---|
| 1,758,088 | Schmick | May 13, 1930 |
| 2,212,211 | Pfund | Aug. 20, 1940 |
| 2,269,674 | Liddel | Jan. 13, 1942 |